US012201959B2

(12) United States Patent
Mistry

(10) Patent No.: US 12,201,959 B2
(45) Date of Patent: Jan. 21, 2025

(54) ADSORBENT MATERIAL

(71) Applicant: HEATHCOAT FABRICS LIMITED, Tiverton (GB)

(72) Inventor: Kamlesh Madhubhai Mistry, Tiverton (GB)

(73) Assignee: Heathcoat Fabrics Limited, Devon (GB)

( * ) Notice: Subject to any disclaimer, the term of this patent is extended or adjusted under 35 U.S.C. 154(b) by 44 days.

(21) Appl. No.: 17/364,101

(22) Filed: Jun. 30, 2021

(65) Prior Publication Data

US 2022/0362738 A1 Nov. 17, 2022

(30) Foreign Application Priority Data

May 17, 2021 (GB) .................................. 2107040.4

(51) Int. Cl.
| | | |
|---|---|---|
| *B01J 20/08* | (2006.01) |
| *B01J 20/20* | (2006.01) |
| *B01J 20/30* | (2006.01) |
| *B01J 20/32* | (2006.01) |
| *D06B 9/00* | (2006.01) |

(Continued)

(52) U.S. Cl.
CPC ............... *B01J 20/08* (2013.01); *B01J 20/20* (2013.01); *B01J 20/3042* (2013.01); *B01J 20/3206* (2013.01); *B01J 20/3236* (2013.01); *B01J 20/324* (2013.01); *D06B 9/00* (2013.01); *D06M 11/46* (2013.01); *D06N 3/0002* (2013.01); *D06N 3/0009* (2013.01); *D06N 3/0015* (2013.01); *D06N 3/0068* (2013.01); *D06N 2211/10* (2013.01); *D06N 2211/24* (2013.01); *Y10T 442/2516* (2015.04)

(58) Field of Classification Search
CPC ............ A62D 2101/02; A62D 2101/04; A62D 2101/26; A62D 3/36; A62D 9/00; A62D 3/30; A62D 3/35; A62D 3/37; A62D 5/00; A62B 18/02; A62B 19/00; A62B 7/10; B01D 2253/204; B01D 53/04; B01J 2531/48; B32B 2264/102; B32B 19/06; Y10T 442/20

See application file for complete search history.

(56) References Cited

U.S. PATENT DOCUMENTS 10,828,873 B1 * 11/2020 Anderson ................. B32B 5/26
2010/0319113 A1 * 12/2010 Rock ......................... B32B 5/26
2/457

(Continued)

OTHER PUBLICATIONS

Textile Glossary, Celanese Acetate, copyright 2001 (Year: 2001).*

*Primary Examiner* — Jennifer A Steele
(74) *Attorney, Agent, or Firm* — GableGotwals; David G. Woodral

(57) ABSTRACT

A flexible material is disclosed comprising a flexible substrate, a sorbent comprising zirconium hydroxide and a binder, wherein the solids weight ratio of the binder to the zirconium hydroxide is in the range 1:1 to 1:120. Also disclosed is a process for production of a fabric, comprising: providing a flexible material, providing at least one sorbent dispersion comprising zirconium hydroxide and a binder, applying the sorbent dispersion to the flexible material to produce a treated flexible material, squeezing the treated flexible material under pressure, and passing the pressed treated flexible material through a stenter.

18 Claims, 2 Drawing Sheets

(51) Int. Cl.
*D06M 11/46* (2006.01)
*D06N 3/00* (2006.01)

(56) References Cited

U.S. PATENT DOCUMENTS

2017/0367416 A1* 12/2017 Yamada .................. B01J 20/22
2019/0232250 A1* 8/2019 Sugiura .................. B01J 20/28

* cited by examiner

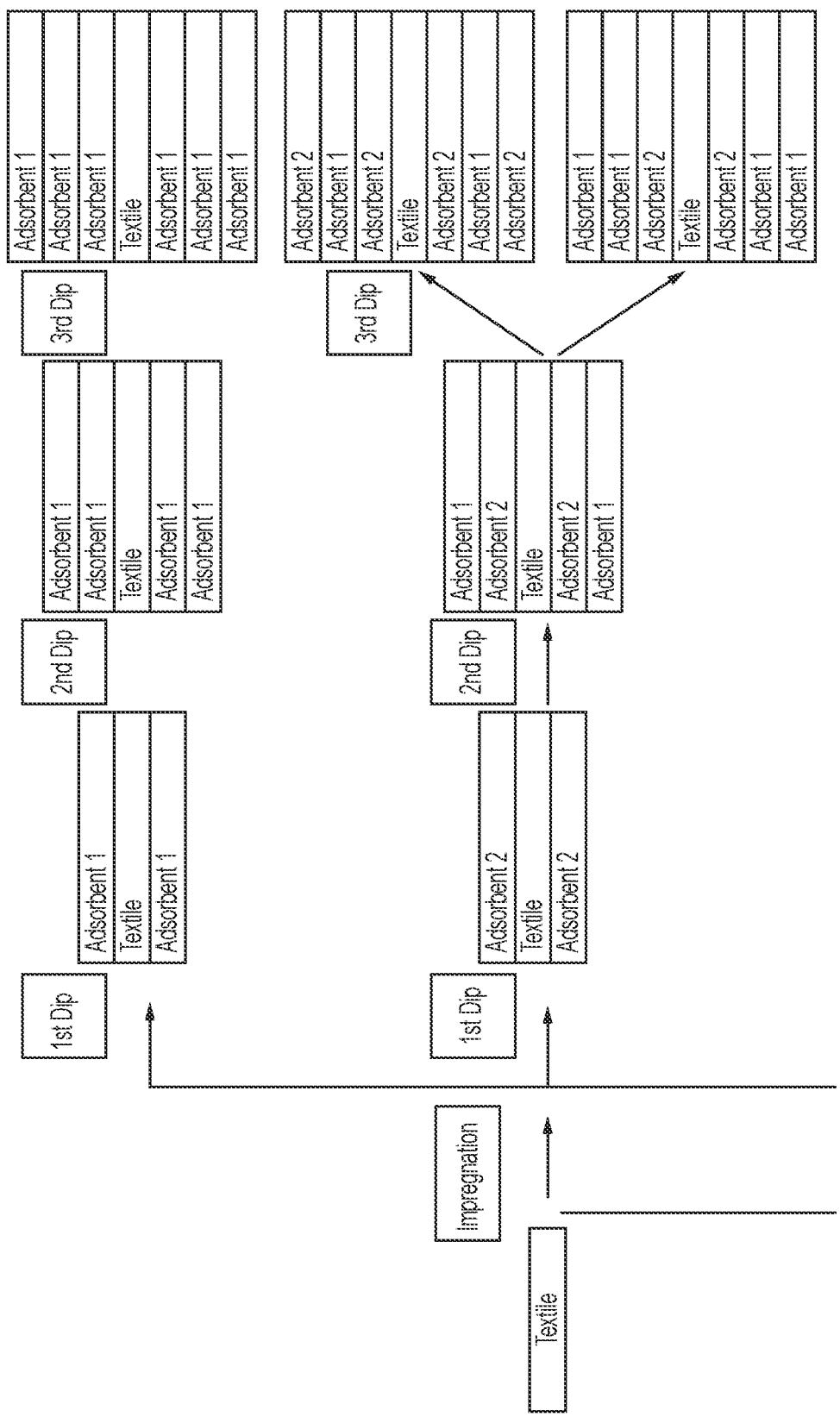

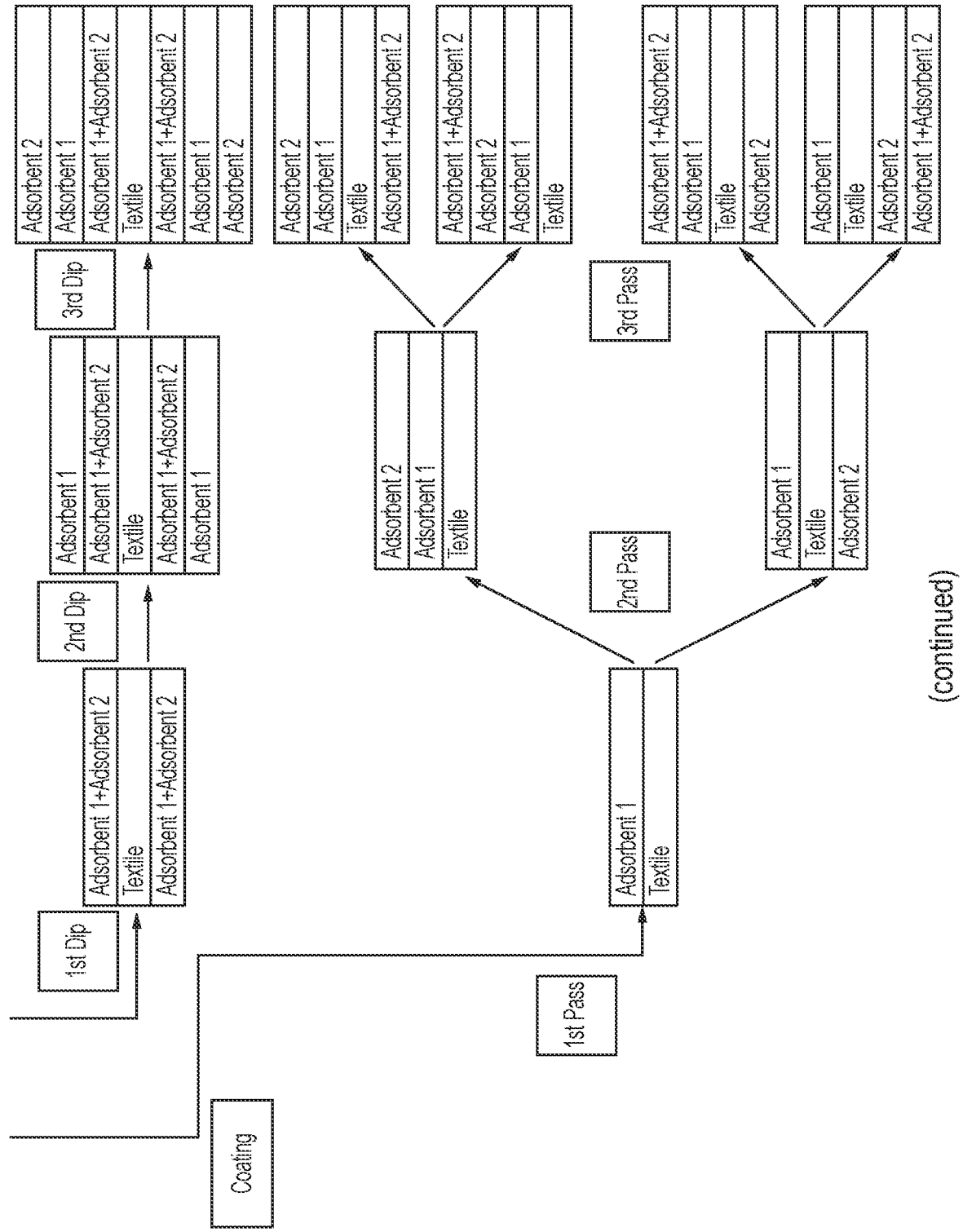

ADSORBENT MATERIAL

CROSS REFERENCE TO RELATED APPLICATION

This application claims the benefit of GB Application No. 2107040.4 filed May 17, 2021 herein incorporated by reference in its entirety for all purposes.

FIELD OF THE INVENTION

The present invention relates to flexible materials comprising a flexible substrate, a sorbent and a binder, to processes for production of such a flexible material incorporating a sorbent, to fabrics produced by such a process, to garments and decontamination wipes comprising such fabrics and to methods for producing sorbent dispersion.

BACKGROUND TO THE INVENTION

Exposure to toxic agents, such as chemical warfare agents (CWA) and related toxins, is a potential hazard to the armed forces and to civilian populations. Examples of commonly known CWA are bis-(2-chloroethyl) sulfide (HD or mustard gas), pinacolyl methylphosphonothiolate (soman or GD), sarin (GB), cyclosarin (GF), and O-ethyl S-(2-diisopropylamino)ethyl methylphosphonothiolate (VX), as well as analogues and derivatives of these agents. CW agents may be delivered as fine aerosol mists which may be inhaled by personnel and may deposit on surfaces of equipment, structures and hardware. If such surfaces have been contaminated, the CWA must be removed in order to reduce contact hazards and to return the item to service.

Contamination with toxic industrial chemicals including pesticides (for example AChE-inhibiting pesticides such as parathion, paraoxon, diazinon and malathion) can also be problematic and can result in contamination of surfaces.

There have been attempts to provide adsorption and absorption materials to decontaminate surfaces and also for use in protective equipment such as clothing and masks.

A common adsorbent is activated carbon which may have a high surface area (e.g. 1000 $m^2/g$ or higher). Activated carbon may have mesoporosity (pores of around 5 nm to 50 nm in size) and micro porosity (pores less than 2 nm in size) but there is a limit to how much control is available to produce specific pore sizes. Activated carbons can be used for decolorizing, deodorizing and adsorbing CWA and retain such agents in the pore structure.

There have been attempts to use other adsorbents. Metal oxides and hydroxides may be produced with controlled pore size and surfaces areas.

U.S. Pat. Nos. 8,530,719 and 10,245,456 disclose the use of zirconium hydroxide and zirconium hydroxide loaded with zinc, triethylenediamine, or zinc plus triethylenediamine to detoxify chemical agents VX and GD. U.S. Pat. No. 10,828,873 discloses a textile composite including a layer with the ability to protect against highly toxic agents and chemicals including chemical warfare agents, industrial chemicals and insecticides using a material of aluminium oxide, silicon-aluminium oxide, zirconium hydroxide, magnesium oxide or titanium dioxide to absorb or adsorb toxic chemicals and subsequently detoxify the adsorbed or absorbed toxic chemical. U.S. Pat. No. 9,907,988 discloses processes for decontaminating surfaces using porous metal hydroxides. U.S. Pat. No. 9,623,404 and US-A-2010/0081186 disclose metal organic framework materials and methods to catalytically detoxify CWA.

The use of adsorbents (which often adsorb solely by physisorption processes) does not generally remove the activity of a CWA so subsequent processes are also required to ensure safety. Furthermore, adsorbed agents can be desorbed by other compounds (e.g. fuels) which may mean that personnel may be at risk of exposure even after decontamination.

Chemical, biological, radiological and nuclear defence (CBRN) clothing used by military forces may have adsorbent material sandwiched between layers of the clothing. The adsorbent may be in the form of activated carbon beads made by the carbonization of resinous thermoset beads, typically 300 μm in diameter. Such a system is effective in adsorbing CWA but does not neutralize the CWA.

Decontamination of CWA from equipment and personnel by powdered adsorbents may be by applying adsorbents on the contaminated area or surface and then collecting the contaminated adsorbent. Adsorbents are usually in powder form to maximize available surface area. However, free-flowing powder may be difficult to control and apply and subsequent cleaning-up operations can be difficult particularly if there are uneven surfaces. There are items such as mitts (e.g. M295) which contain a free flowing adsorbent within the assembly. However, due to the relatively bulky nature of the mitt it may not be easily deployed, can be difficult to get into crevasses etc. and the mitt fabric absorbs the CWA, which may mean the adsorbent is less effective. Decontamination wipes are known (e.g. Steris Wipes) but again these only absorb CWA and the wipes remain hazardous after use.

Adsorbents in masks are usually used as granules to improve handling since powders may be prone to dusting, which may lead to the compaction and development of a back pressure to gas flow when powders settle (e.g. under gravity). Powders in porous envelopes (e.g. mitts) require fine meshes to prevent powder spilling.

Granulation of materials may allow fine powders to be combined to give large more manageable materials. However, granulation may also lead to problems with loss of effective surface area because adhesives etc. may cover active sites or pores on the surface of the sorbents.

There is, therefore, a need to provide improved materials containing sorbents that retain their activity but are immobilised to provide enhanced safety and to improve decontamination and neutralisation of CWA and other potentially toxic chemicals. In addition, there is a need to provide improved materials in a form which is easier to handle and conformable.

It is an aim of the present invention to address this need.

SUMMARY OF THE INVENTION

In one aspect, the present invention accordingly provides a flexible material comprising a flexible substrate, a sorbent comprising zirconium hydroxide and a binder, wherein the solids weight ratio of the binder to the zirconium hydroxide is in the range 1:1 to 1:120, optionally 1:2 to 1:40, optionally 1:2 to 1:24, optionally 1:2 to 1:12, optionally 1:2 to 1:10, optionally 1:2 to 1:4.

In another aspect, the present invention provides a process for production of a fabric, the process comprising:
a) providing a flexible material,
b) providing at least one sorbent dispersion comprising zirconium hydroxide and a binder,
c) applying the sorbent dispersion(s) to the flexible material to produce an impregnated flexible material, d) squeezing the impregnated flexible material under pressure, e) passing the pressed impregnated flexible material through a stenter, and f) optionally repeating any one of steps b), c), d) and e).

The sorbent dispersion may comprise both zirconium hydroxide and the binder and be applied to the material. Alternatively, one dispersion may comprise zirconium hydroxide and a second dispersion may comprise the binder and be applied after application of zirconium hydroxide (e.g. in a subsequent surface or topical treatment).

The sorbent dispersion may further comprise at least one further material, optionally at least one further sorbent. Examples of such further sorbents include those selected from one or more of an MOF, aluminium oxide, silicon-aluminium oxide, activated carbon, magnesium oxide and/or titanium dioxide.

MOF refers to Metal—Organic Frameworks which comprise metal ions or clusters coordinated to organic ligands to form one-, two-, or three-dimensional structures. Preferably the MOF is porous. The organic ligands included may be referred to as "struts" or "linkers", one example of a strut is 1,4-benzenedicarboxylic acid (BDC).

More formally, a metal-organic framework refers to a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions. A coordination polymer is a coordination compound with repeating coordination entities extending in one, two, or three dimensions. The preferred metal in a MOF for use in the invention is Zr. Examples of MOF materials include the zirconium metal—organic framework materials UiO-66 and UiO-66-$NH_2$.

Preferably, the zirconium hydroxide may have a particle size in the range 0.05 μm to 100 μm, or 0.1 to 100 μm, preferably 1 μm to 55 μm or 2 μm to 55 μm, more preferably 2 μm to 45 μm or 3 μm to 45 μm.

It is preferred that the flexible material comprises a textile. The textile may be selected from a knitted textile, a woven textile and a non-woven textile. Preferably, the textile is a knitted textile, optionally a pile knitted textile. To further improve the amount of sorbent impregnated, the textile may be bulked, for example by being texturised.

The textile may comprise natural fibres, synthetic fibres or a combination of natural and synthetic fibres. It is advantageous if the textile comprises elastane. This is advantageous because the use of elastane may improve stretch, conformability and recovery. Alternatively or additionally, the structure of a fabric and/or texturization of the yarns may be adapted to provide a conformable material with suitable stretch characteristics.

Preferably, the flexible material is at least partially porous.

The sorbent dispersion will usually further comprise a solvent, for example ethanol, propanol, and/or water, preferably water to provide a sorbent aqueous dispersion. Other solvents for example lower hydrocarbons could potentially be used, aliphatic or aromatic. Examples include hexane, benzene, or toluene. Acetone or diethyl ether may alternatively be used.

To improve impregnation, it is beneficial that the impregnated flexible material is pressed at a predetermined pressure. Generally, the impregnated flexible material may be pressed at a predetermined pressure in the range 1 psi (6.9 kPa) to 150 psi (1 MPa), optionally 20 psi (138 kPa) to 100 psi (0.69 MPa), optionally 70 psi (0.48 MPa) to 100 psi (0.69 MPa). The pressure may depend on the device used to press the flexible material. For example, a mangle may use a pressure in the range 10 psi (69 kPa) to 100 psi (690 kPa).

The sorbent dispersion may have a viscosity in the range 40 cps to 4000 cps, optionally 50 cps to 2000 cps, optionally 100 cps to 1000 cps, optionally 200 cps to 600 cps. The pressure may be adjusted in order to increase or decrease the loading of each pass. The viscosity of the sorbent solution may be adjusted for different applications.

The solids weight ratio of the binder to the zirconium hydroxide in the product aspect or the process aspect may be in the ranges discussed above. Usually, when the fabric is intended for garments the binder ratio may be such that there is a higher proportion of binder to improve durability e.g. a ratio in the range binder:zirconium hydroxide of 1:1 to 1:24, preferably 1:1 to 1:12, preferably 1:1 to 1:10, more preferably 1:1 to 1:4. When the fabric is intended for e.g. decontamination wipes the lower amount of binder may be useful (since the sorbent does not need to be retained as long and to increase sorbancy) of e.g. binder:zirconium hydroxide 1:12 to 1:120, preferably 1:12 to 1:40.

The dispersion may further comprise a polymeric thickener, a protective colloid, and/or a wetting agent. The protective colloid may be selected from carboxy methyl cellulose, methyl cellulose, hydroxy propyl methyl cellulose, Xanthan gum and/or polyvinyl alcohol but others are available.

The binder may comprise a polymeric emulsion, optionally selected from an acrylic, a polyurethane, a natural rubber latex, chloroprene, styrene-butadiene rubber (SBR) and/or nitrile rubber. The binder can also be a dispersion of a polymer and may or may not be an emulsion.

The dispersion may have a pH in the range 3 to 14, optionally 6 to 12. This is advantageous because this pH range may improve thickening for e.g. an alkali swellable thickening agents. Alternatively, the pH can be 3 to 7 for e.g. a higher solids and/or a different thickening mechanism.

The process and product may usually be adapted e.g. by varying the number of passes (i.e. repeats in the process) viscosity of the dispersion, loading of sorbent in the dispersion and hence on product and/or pressure of the roller). For example, the sorbent may be loaded on the flexible material at 50 to 500 $g/m^2$ dry weight, preferably at 150 to 450 $g/m^2$ dry weight, more preferably at 175 to 425 $g/m^2$ dry weight, most preferably at 200 to 400 $g/m^2$ dry weight; suitably at 250 to 350 $g/m^2$ dry weight or 100 to 300 $g/m^2$ dry weight.

The sorbent dispersion may be applied to the flexible material using a method selected from knife over air coating, knife over roller coating and transfer coating, gravure coating, dot coating, and/or spray coating.

In order to modify the loading or to produce more than one sorbent or sorbent-loading in the fabric, the steps b) to e) of the process may be repeated at least once to increase the sorbent loading on the flexible material. Thus, applying the sorbent dispersion to the flexible material may use a first sorbent dispersion and a second sorbent dispersion (that may be different) in the second repeat of the steps c) and e). Optionally a mixed adsorbent system may be used in one or more applications, e.g. mixed zirconium hydroxide/activated carbon. The process may further comprise subsequently treating the flexible material with a hydrophobic composition to render the surface hydrophobic. Such a hydrophobic composition may comprise a fluorinated compound, optionally a fluorinated silane.

In a third aspect the invention provides a flexible material comprising a sorbent obtainable by a process according to the first aspect.

In a fourth aspect the invention provides a protective garment comprising a flexible material according to the first aspect or as produced in the second aspect.

In a fifth aspect the invention provides a decontamination wipe comprising a flexible material according to the first aspect or as prepared according to the second aspect.

In a sixth aspect, the invention provides a method for preparation of a sorbent dispersion, the process comprising: providing a solvent, a sorbent comprising zirconium hydroxide, a protective colloid, a binder, optionally a wetting agent, and optionally a thickener, adding the sorbent to the solvent, optionally in the presence of the wetting agent, adding the protective colloid, optionally adding the thickening agent, and adding the binder and optionally adding a second wetting agent.

The optional second wetting agent may be the same or different to the wetting agent used to disperse the adsorbent.

The method may use a high shear mixer if it is intended to break up or reduce the particle size of the sorbent.

Thus, aspects of the disclosure are as listed below in the following numbered paragraphs.

Paragraphs

1. A flexible material comprising a flexible substrate, a sorbent comprising zirconium hydroxide and a binder, wherein the solids weight ratio of the binder to the zirconium hydroxide is in the range 1:1 to 1:120, optionally 1:2 to 1:40, optionally 1:2 to 1:24, optionally 1:2 to 1:12, optionally 1:2 to 1:10, optionally 1:2 to 1:4.
2. A flexible material according to paragraph 1, wherein the sorbent comprises at least one further sorbent.
3. A flexible material according to either paragraph 1 or paragraph 2, wherein further material is selected from one or more of a MOF, aluminium oxide, silicon-aluminium oxide, activated carbon, magnesium oxide and/or titanium dioxide.
4. A flexible material according to any preceding paragraph, wherein the zirconium hydroxide has a particle size in the range 0.05 µm to 100 µm, preferably 1 µm to 55 µm, more preferably 3 µm to 45 µm
5. A flexible material according to any preceding paragraph, wherein the flexible material comprises a textile.
6. A flexible material according to paragraph 5, wherein the textile is selected from a knitted textile, a woven textile and a non-woven textile.
7. A flexible material according to either paragraph 5 or paragraph 6, wherein the textile is a knitted textile, optionally a pile knitted textile.
8. A flexible material according to any one of paragraphs 5 to 7, wherein the textile is texturised.
9. A flexible material according to any one of paragraphs 5 to 8, wherein the textile comprises a natural or synthetic textile or a combination of natural and synthetic.
10. A flexible material according to any one of paragraphs 5 to 9, wherein the textile comprises elastane.
11. A process for production of a fabric, the process comprising:
    a) providing a flexible material,
    b) providing at least one sorbent dispersion comprising zirconium hydroxide and a binder,
    c) applying the sorbent dispersion to the flexible material to produce a treated flexible material,
    d) squeezing the treated flexible material under pressure,
    e) passing the pressed treated flexible material through a stenter, and
    f) optionally repeating any one of steps b), c), and e).
12. A process according to paragraph 11, wherein the sorbent dispersion further comprises at least one further sorbent.
13. A process according to paragraph 12, wherein the further sorbent is selected from one or more of a MOF, aluminium oxide, silicon-aluminium oxide, activated carbon, magnesium oxide and/or titanium dioxide.
14. A process according to any one of the preceding paragraphs 11 to 15, wherein the zirconium hydroxide has a particle size in the range 0.1 µm to 100 µm, preferably 5 µm to 55 µm, more preferably 5 µm to 45 µm.
15. A process according to any one of the preceding paragraphs 11 to 14, wherein the flexible material comprises a textile.
16. A process according to paragraph 15, wherein the textile is selected from a knitted textile, a woven textile and a non-woven textile.
17. A process according to either paragraph 15 or paragraph 16, wherein the textile is a knitted textile, optionally a pile knitted textile.
18. A process according to any one of paragraphs 15 to 17, wherein the textile is texturised.
19. A process according to any one of paragraphs 15 to 18, wherein the textile comprises a natural or synthetic textile or a combination of natural and synthetic.
20. A process according to any one of paragraphs 15 to 19, wherein the textile comprises elastane.
21. A process according to any one of the preceding paragraphs 11 to 20, wherein the flexible material is at least partially porous.
22. A process according to any one of the preceding paragraphs 11 to 21, wherein the sorbent dispersion further comprises a solvent, preferably water to provide a sorbent aqueous dispersion.
23. A process according to any one of the preceding paragraphs 11 to 22, wherein the impregnated flexible material is pressed at a predetermined pressure in the range 1 psi (6.9 kPa) to 150 psi (1 MPa), optionally 20 psi (138 kPa) to 100 psi (0.69 MPa), optionally 70 psi (0.48 MPa) to 100 psi (0.69 MPa).
24. A process according to any one of the preceding paragraphs 11 to 23, wherein the sorbent dispersion has a viscosity in the range 40 cps to 4000 cps, optionally 50 cps to 2000 cps, optionally 100 cps to 1000 cps, optionally 200 cps to 600 cps.
25. A process according to any one of the preceding paragraphs 11 to 24, wherein the solids weight ratio of the binder to the zirconium hydroxide is in the range 1:1 to 1:120, optionally 1:2 to 1:40, optionally 1:2 to 1:24, optionally 1:2 to 1:12, optionally 1:2 to 1:10, optionally 1:2 to 1:4.
26. A process according to any one of the preceding paragraphs 11 to 25, wherein the dispersion further comprises a polymeric thickener, a protective colloid, and/or a wetting agent.
27. A process according to any one of the preceding paragraphs 11 to 26, wherein the protective colloid is selected from carboxy methyl cellulose, methyl cellulose, hydroxy propyl methyl cellulose, Xanthan gum and/or polyvinyl alcohol.
28. A process according to any one of the preceding paragraphs 11 to 27, wherein the binder comprises a polymeric emulsion, optionally selected from an acrylic, a polyurethane, a natural rubber latex, chloroprene, styrene-butadiene rubber (SBR) and/or nitrile rubber, and optionally a colloid stabiliser and optionally a thickener.
29. A process according to any one of the preceding paragraphs 11 to 28, wherein the dispersion has a pH in the range 3 to 14.
30. A process according to any one of the preceding paragraphs 11 to 28, wherein the sorbent is loaded on the flexible material at 50 to 500 $g/m^2$ dry weight, preferably at 100 to 475 $g/m^2$ dry weight, preferably 150 to 450 $g/m^2$ dry weight, more preferably at 175 to 425 $g/m^2$ dry weight, most preferably at 200 to 400 $g/m^2$ dry weight; suitably at 250 to 350 $g/m^2$ dry weight or 100 to 300 $g/m^2$ dry weight.
31. A process according to any one of the preceding paragraphs 11 to 30, wherein the sorbent dispersion is applied to the flexible material using a method selected from knife coating over air, knife coating over roller and transfer, gravure coating, dot coating, and/or spray coating.
32. A process according to any one of the preceding paragraphs 11 to 31, wherein the steps b) to d) of the process are repeated at least once to increase the sorbent loading on the flexible material.
33. A process according to paragraph 32, wherein applying the sorbent dispersion to the flexible material uses a first sorbent dispersion and a second different sorbent dispersion in the second repeat of the steps c) and d).
34. A process according to any one of the preceding paragraphs 11 to 33, further comprising subsequently treating the flexible material with a hydrophobic composition to render the surface hydrophobic and/or subsequently treating the flexible material with a hydrophilic composition to render the surface hydrophilic.
35. A process according to paragraph 34, wherein the hydrophobic composition comprises a fluorinated compound, optionally a fluorinated silane.
36. A flexible material comprising a sorbent obtainable by a process according to any one of paragraphs 11 to 35.
37. A protective garment comprising a flexible material according to any one of paragraphs 1 to 10.
38. A decontamination wipe comprising a flexible material according to any one of paragraphs 1 to 10.
39. A method for preparation of a sorbent dispersion, the process comprising:
providing a solvent, a sorbent comprising zirconium hydroxide, a protective colloid, a binder, optionally a wetting agent, and optionally a thickener
adding the sorbent to the solvent, optionally in the presence of the wetting agent,
adding the protective colloid,
optionally adding the thickening agent, and
adding the binder, and
optionally adding a second wetting agent.
40. A method according to paragraph 39, wherein the method uses a high shear mixer.

BRIEF DESCRIPTION OF THE DRAWINGS

Embodiments of the present invention will be described in more detail with reference to the accompanying FIGURE in which:
FIG. 1 shows schematically an embodiment of the method of applying adsorbents using an impregnation method and/or a coating method showing the combinations of products that may be produced.

DETAILED DESCRIPTION OF THE INVENTION

The present invention will now be described by way of example only with reference to the following non-limiting embodiments. Various options for applying the sorbent are illustrated, without limitation, in FIG. 1.
Impregnation (Dipping) of Adsorbent on Fabric
CBRN Clothing Application
For impregnation preferably any flexible material may be used providing it can hold a level of the applied finish. Flexible in this context is one which will easily be processed on an impregnation or coating production line.
Impregnation or coating may be carried out using an aqueous based application method as this is a more environmentally friendly as it limits or eliminates the of use of VOCs. The principle of impregnation is that a finish (formulation) is applied to a substrate where it is generally uniformly distributed throughout the textile as the substrate is fully immersed in the finish. To control the amount that is present on the fabric the soaked fabric may go through a mangle or nip. The wet fabric passes between the two rolls under pressure which causes excess finish to be squeezed out (running off back into the trough of finish) and leaving a set amount on the fabric. The amount of finish that is on the fabric is quantified as a wet pick up and is a percentage value based on the weight of finish on the fabric and the weight of the fabric. The wet pick up, for a given formulation/finish, is primarily dictated by the substrate structure and the pressure applied between the two bowls; to a lesser extent the viscosity of the finish can also influence this parameter. The resulting treated substrate is dried by going through a set of heating ovens—this is referred to as a stenter.
The concentration of the finish and the wet pick up determine the amount of overall solids that are applied in the process to the substrate. If there was insufficient adsorbent applied through a single pass, then then treated fabric can be put through the process again i.e. a second pass to apply more on. Carrying out a number of passes may be useful.
In a more complex process each pass may be different, and this results in a layered application. Determining the wet pick up and the applied solids allows an optimized formulation to be applied. Very high solids on a substrate cannot always be achieved in a single pass and so multiple passes may be required.
A starting formulation is provided which can be adjusted to accommodate various applications—see Formulation F1 in Tables 1 and 2.
The ratio of binder system to the adsorbent is important in controlling the rates of these sorption processes. In the starting formulation given for every 1 part by weight of binder 3.8 parts by weight of zirconium hydroxide is used. This provides a reasonable level of durability with very little or no shedding taking place.
Another factor is the particle size of the adsorbent. For the larger the particle size the ratio of surface area to volume is smaller than for a smaller particle. This means that for a given amount of material it is better to have bigger particle as less off the bulk of the material is affected by the binding system. There will be a compromise on particle size dependent upon the application technique being used and the nature of the adsorbent.
An important aspect when considering binder is that all the auxiliary components can influence the binder solids content. By this we mean that if a binder is used and e.g. a polymeric thickener then the polymer thickener solids will contribute towards the binding capacity.

Depending upon the nature of the adsorbent system and how prone it is to sedimentation then a thickening agent may be required, and this is to ensure that the adsorbent remains suspended for a sufficient length of time to prevent settling and so avoid inconsistent application.

The filling of the pores is an issue as it prevents or reduces the likelihood that other components enter and block the pores, thus a wetting agent may be used. The act of drying (during stentering) is important as it is believed that the evaporation of the water out of the pores helps breakthrough any film forming material to allow these pores to be accessible. The term wetting agent and dispersing agent are used interchangeably as it depends on the auxiliary used.

For some adsorbents, a wetting agent is not required as they will readily wet out in water as they are hydrophilic in nature. Generally, inorganics will tend to wet out relatively easily without the aid of a wetting agent. In the examples, zirconium hydroxide can be incorporated quite effectively without the use of a wetting agent as shown in the decontamination wipe formulation F6. The adsorbent may be of a particular particle size depending upon the application technique and also textile being used. Generally, for pad application the particle size may be less than 100 microns and preferably at or below 45 microns. Having smaller particle size than 45 microns is desirable from an application point of view but a comprise has to be reached as potentially pore volume properties will be compromised for certain adsorbents.

Smaller particle sizes will aid creating a good suspension as this is less likely to settle out. Adsorbents with high densities can be dispersed this way. The adsorbent can be supplied already as a ground powder which is ready for dispersing.

The first step is to incorporate the adsorbent in water; depending upon the nature of the adsorbent a wetting agent may be required to effectively incorporate it into the water. Generally inorganic adsorbents are readily dispersible in water as they are generally polar and hydrophilic in nature. The wetting agent can be selected from wide range that are generally available. Good wetting characteristics are achieved e.g. through the use of a sodium salt of a polymeric naphthalene sulphonate. These are particularly good at dispersing organic material which are generally hydrophobic in nature. Dispersing agent not only wet out but produce a charged system to reduce the propensity for agglomeration to take place.

The amount used will be enough to ensure the adsorbent can be effectively wetted and dispersed. Wetting agent could be fugitive in nature—small molecules such as IPA.

The choice of stirrer may affect incorporation of the adsorbent. A traditional propellor type stirrer may be used for mixing. The use of a high shear stirrer can be used. A high shear stirrer can be used to good effect to reduce the particle size if the starting material is too coarse for the application; the resulting reduced particle size adsorbent system then be used in a propellor mixing system for the remainder of the formulation.

High shearing for certain adsorbents can be advantageous in controlling the viscosity of the mix and in keeping the adsorbent suspended.

Protective colloids may be used. This may be useful where the adsorbent is particularly active. An example would be activated carbon where the surface is active and adsorbs organic molecules readily. If a binder was to be added directly to a dispersion of the activate carbon then coagulation/flocculation of the system may take place. Protective colloids are ideally large molecules which reduces the propensity for them entering the pores of the adsorbent but also provides steric hindrance to prevent agglomeration taking place. Examples of colloid stabilizers are carboxy methyl cellulose, methyl cellulose, hydroxy propyl methyl cellulose, Xanthan gum, polyvinyl alcohols, etc.

The ideal amount of the colloid stabilizer can be established by trial and error; generally adding a known amount and then checking to see if coagulation take place on addition of the binder system. The addition of the colloid stabilizer can help in controlling the viscosity; in this context it will help in maintain a low viscosity for ease of mixing. The amount of the protective colloid used, may help control the overall viscosity. After the addition of the colloid stabilizer it is generally desirable to leave stirring for a given length of time, for example 15 minutes, to ensure good stabilization.

As mentioned previously the end application can dictate the formulary components used and it is possible to just to use an adsorbent and the protective colloid as the latter will have film forming capabilities.

The binder can be added next slowly. The binders would typically be an emulsion polymer—be it synthetic or natural although a binding system based on a dispersion can also be used. The binder can be a variety of system, acrylic, polyurethane, natural rubber latex, nitrile etc. The function of the binder is to bind the adsorbent to the substrate. In general, the more durable the adsorbent needs to be adhered to the textile the more binder is required. If the durability is less of a concern then the amount of binder can be reduced.

The binder (and the protective colloid) can affect the handle of the material so a softer film forming emulsion would give a more conformable product. The pH of the emulsion may be taken into consideration in the formulation and adjustments may be required in terms of pH to allow it to be used.

Depending upon the particle size of the adsorbent used it may be that the resulting suspension is adequately stable with no sedimentation taking place in which case it is ready for application work. If the particles are coarse or the dispersed adsorbent has the propensity to settle then a thickener needs to be used. There are a variety of thickeners that can be used to thicken up water-based systems and those in the field will be aware of these. An alkali swellable thickener is particularly suitable. Ammonia may be added to the formulation to ensure an appropriate alkalinity and has the advantage that it is fugitive in nature when exposed to heat returning system to its original pH.

Sedimentation can be assessed—using a spatula to check if there is any sedimentation after a given length of time. The rate of sedimentation should reflect the process in which the system is to be used and so the viscosity and so the amount of thickener can be adjusted accordingly. Essentially no sedimentation should be observed for period that the formulation would be in the trough in a production process. Having no sedimentation for around 1 hr is a reasonable test.

By using a combination of viscosity control and additional production stirring/agitation one can prevent sedimentation taking place in the production environment. Once the dip is prepared it is ready to be applied to a textile substrate by impregnation. Different adsorbents can be applied in different passes—formulation F4 shows a carbon only adsorbent formulation that can be applied so a layered system can be generated. Formulation F5 & F7 represents a mixed adsorbent systems with activated carbon and zirconium hydroxide intimately mixed at different ratios i.e. blended application.

Some adsorbent systems, once dried, will become slightly hydrophobic in nature. This may cause a potential issue for any subsequent impregnation as the finished fabric may not absorb/wet out effectively when immersed in a formulation. In order to overcome this issue a wetting agent may be added in the adsorbent formulation to aid wetting of hydrophobic surface. Examples may be fugitive wetting agent such as IPA or other suitable materials for example alcohol polyglycol ether. Formulation F7 shows the use of such a system.

The textile may be more absorbent through the use of textured yarn and or through construction. Having a hydrophilic finish on the textile will also help with wetting out of the textile and improved absorption. Textiles could be a knitted, woven, or non-woven. A non-textile material such as foam could also be used as this a porous substrate.

A good example of a textile is a knitted pile fabric which has loops of yarn which create bulk. The textile may be of synthetic or natural yarns or mixed dependent upon the requirements of the end application. Double pile fabrics are particularly advantageous. Other textiles such as nonwovens can be used but application will be slow to build up solids but again it depends on the bulk and absorbency characteristic. Textiles or substrates can have stretch which will lead to more conformable material if required. Knitted structures containing elastane would be suitable although stretch can be introduced through construction and use of textured yarns alone; this can further be supplemented with the use of an elastane in the structure. Woven structures with textured yarns may be supplemented with the presence of an elastane to improve the stretch characteristics. The application of the dispersion results in a treated textile.

Application of up to around 500 gsm of solids formulation may be useful. The textile can be treated to provide appropriate wetting characteristics or/and repellence effects; where for example it may be desirable to prevent rapid absorption of the CWA agent in which case a repellence effect is desirable. In this situation a fluorochemical treatment can be applied as a separate treatment. Such treatment will provide oleophobic as well as hydrophobic effects. It may be desired that good wetting is required so that the CWA does not overwhelm the adsorbent but is distributed over a wider area of the treated textile; so a polar hydrophilic may be required. The nature of the wetting characteristics will depend upon the CWA that is likely to be used and whether the CWA is classed as being hydrophobic or hydrophilic (polar) in nature. If just a water-repellent effect is required then the finish can be tailored to provide this effect.

Examples of such finishes are silicones, hydrocarbon or structured effects i.e. nano finishes. The amount of finish to give this effect must be balanced with the fact that such finishes can cause reduced reactivity of the adsorbent system. It may be desirable to have hydrophilic effects and this can be achieved through the use of suitable polar hydrophilic finishes such as polyethylene glycol, polyvinyl alcohol etc.

Decontamination Wipes

For decontamination wipes advantageously zirconium hydroxide is used because it actively destroys many contaminants. The adsorbent does not have to be as robustly attached to the material as durability is not as important. A formulation that may be used may be e.g. Formulation F6.

A ratio of binder to adsorbent at approximately 1:40 (compared that with the CBRN clothing application where the binder to adsorbent ratio is around 1:4 respectively) may be used. The textile may be a single pile fabric e.g. a polyester knitted fabric. Other substrates and textiles can be used in conjunction with different fibre types. A double pile fabric is desirable as this will hold more formulation and either face would be effective in picking up CWA. It is anticipated that around 25 to 300 g/m$^2$ solids loading may be effective where zirconium hydroxide is used as the adsorbent for a 10 g/m$^2$ CWA challenge.

Mixed adsorbents (e.g. ZOH and activated carbon) can be used, and further functionalization to enhance the reactivity can be employed. A layered system can also be created where different adsorbents are applied at each pass.

EXAMPLES

Formulations F1 to F7 were prepared and applied to samples of a fabric. Table 1 describes the preparation of formulation F1 and the composition of each formulation is described in table 2, below. The fabric was a knitted pile fabric with the construction as follows:

| | Courses/ 10 cm | Wales/ 10 cm | thickness/ mm | Weight/ gsm | Pile height/mm |
|---|---|---|---|---|---|
| Weft Knitted Fabric Pile Fabric | 100 to 130 | 95 to 125 | 0.85 to 1.05 | 100 to 120 | 1.09 to 1.21 |

In the Formulations:

F1—Base starting formulation—Zirconium Hydroxide

F2—Thickened formulation to keep Zirconium Hydroxide suspended

F3—High Shear Slurry of Zirconium Hydroxide-Particle size reduced to D95 4 microns F4—Standard formulation for activated carbon with D95 45 microns F5—Thickened formulation containing a mixture of adsorbents—activated carbon & Zirconium Hydroxide F6—Low binder system for Decontamination Wipe Application.

F7—Thickened formulation containing a mixture of adsorbents—activated carbon & zirconium hydroxide with inclusion of wetting agent.

TABLE 1

Preparation of formulation 1.

| Sequence of Addition | Component | Nature | Amount (g/100) | Solids Content of Individual Components in Supplied Product (%) | Solids present in formulation for product (g) |
|---|---|---|---|---|---|
| 1 | Water | Solvent | 52.54 | 0 | 0 |
| 2 | Polynaphthalene Sulphonate, Sodium Salt | Dispersing Agent | 1.84 | 20 | 0.4 |
| 3 | Zirconium Hydroxide | Adsorbent | 20 | 90 | 18 |

TABLE 1-continued

| | | Preparation of formulation 1. | | | |
|---|---|---|---|---|---|
| 4 | Carboxymethyl cellulose sodium salt Solution | Colloid Stabiliser | 17.12 | 3 | 0.5 |
| 5 | Self crosslinking acrylic polymer dispersion | Binder | 8.5 | 50 | 4.3 |
| | | | 100 | | 23.2 |

| | Amount in Formulation (g) | Ratio |
|---|---|---|
| Zirconium Hydroxide | 18 | 3.8 |
| Binder System | 4.8 | 1 |

TABLE 2

Composition of formulations F1 to F7

| Components | F1 (g/100) | F2 (g/100) | F3 (g/100) | F4 (g/100) | F5 (g/100) | F6 (g/100) | F7 (g/100) |
|---|---|---|---|---|---|---|---|
| Water | 52.54 | 51.81 | 52.54 | 52.54 | 51.81 | 78.2 | 51.01 |
| ZOH (D95 4 micron) | 20 | | | | | | |
| ZOH, Mesh < 100, 15% moisture | | | 20 | | | | |
| ZOH, Mesh < 200, 15% moisture | | | | | 15 | | |
| ZOH, Mesh < 325, 11% moisture | | 20 | | | | | |
| Activated Carbon Powder, Mesh < 325 | | | | 20 | 5 | | 8 |
| ZOH, Mesh < 325, 10% Moisture | | | | | | 20 | 12 |
| Dispersing Agent (20%) | 1.84 | 1.84 | 1.84 | 1.84 | 1.84 | | 1.84 |
| Carboxy methyl cellulose Soln (3%) | 17.12 | 17.12 | 17.12 | 17.12 | 17.12 | | 17.12 |
| Acrylic Dispersion | 8.5 | 7.9 | 8.5 | 8.5 | 7.9 | 0.3 | 7.9 |
| Ammonia (24%) | 0 | 0.5 | 0 | 0 | 0.5 | 0.5 | 0.5 |
| Alkali Swellable Acrylic Thickener | 0 | 0.83 | 0 | 0 | 0.83 | 1 | 0.63 |
| Alcohol, polyglycolether | 0 | 0 | 0 | 0 | 0 | 0 | 1 |
| Total | 100 | 100 | 100 | 100 | 100 | 100 | 100 |

ZOH refers to zirconium hydroxide

All publications mentioned in the above specification are herein incorporated by reference. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The invention claimed is:

1. A flexible material comprising:
   a flexible substrate,
   a sorbent comprising zirconium hydroxide, and
   a binder,
   wherein:
   the solids weight ratio of the binder to the zirconium hydroxide is in the range 1:1 to 1:120,
   the binder comprises a polymer emulsion, or a dispersion of polymers,
   the sorbent is loaded on the flexible material at 50 to 500 g/m² dry weight, and
   the flexible material is for protection and/or decontamination and/or neutralisation of toxic chemicals.

2. A flexible material according to claim 1, wherein the sorbent comprises at least one further sorbent.

3. A flexible material according to claim 2, wherein further material is selected from one or more of a MOF, aluminium oxide, silicon-aluminium oxide, activated carbon, magnesium oxide and/or titanium dioxide.

4. A flexible material according to claim 1, wherein the zirconium hydroxide has a particle size in the range 0.05 μm to 100 μm.

5. A flexible material according to claim 1, wherein the flexible material comprises a textile.

6. A flexible material according to claim 5, wherein the textile is selected from the group consisting of a knitted textile, a woven textile and a non-woven textile.

7. A flexible material according to claim 6, wherein the textile is a knitted textile, optionally a pile knitted textile.

8. A flexible material according to claim 5, wherein the textile is texturised.

9. A flexible material according to claim 1, wherein the textile comprises a natural or synthetic textile or a combination of natural and synthetic textiles.

10. A flexible material according to claim 1, wherein textile comprises elastane.

11. A flexible material according to claim 1, wherein the flexible material is in the form of a protective garment.

12. A flexible material according to claim 1, wherein the flexible material is in the form of a decontamination wipe.

13. A flexible material according to claim 1, wherein the sorbent is derived from a sorbent dispersion comprising zirconium hydroxide and a binder and further comprising a solvent.

14. A flexible material according to claim 11, wherein the solvent comprises water.

15. A flexible material according to claim 1, wherein the polymeric emulsion, is selected from the group consisting of an acrylic, a polyurethane, a natural rubber latex, chloroprene, styrene-butadiene rubber (SBR) and/or nitrile rubber.

16. A flexible material according to claim 11, wherein the protective garment is selected from a suit, a glove, a gauntlet, a mask, a gas mask, a sock, a head cover, trousers and/or a jacket.

17. A flexible material according to claim 12, wherein the decontamination wipe comprises a mitt.

18. A flexible material comprising:
a flexible substrate,
a sorbent comprising zirconium hydroxide and
a binder,
wherein the solids weight ratio of the binder to the zirconium hydroxide is in the range 1:1 to 1:120,
the binder comprises a polymer emulsion, or a dispersion of polymers,
the sorbent is loaded on the flexible material at 150 to 500 g/m2 dry weight, and
wherein the flexible material is for protection and/or decontamination and/or neutralisation of toxic chemicals.

\* \* \* \* \*